(12) United States Patent
Sumita et al.

(10) Patent No.: US 6,862,946 B2
(45) Date of Patent: Mar. 8, 2005

(54) GEARED MOTOR COMPRISING POSITION SENSOR

(75) Inventors: Yasuyuki Sumita, Numazu (JP); Kichinosuke Ono, Numazu (JP); Ryuichi Uchida, Numazu (JP); Mikio Kamitake, Kobe (JP); Haruo Kitai, Kobe (JP)

(73) Assignees: Kokusan Denki Co., Ltd, Shizuoka-ken (JP); Kawasaki Heavy Industries, Ltd., Hyogo-ken (JP)

( * ) Notice: Subject to any disclaimer, the term of this patent is extended or adjusted under 35 U.S.C. 154(b) by 179 days.

(21) Appl. No.: 10/385,130

(22) Filed: Mar. 10, 2003

(65) Prior Publication Data

US 2004/0103733 A1 Jun. 3, 2004

(30) Foreign Application Priority Data

Dec. 2, 2002 (JP) ........................................ 2002-349835

(51) Int. Cl.[7] .............................................. H02K 7/116
(52) U.S. Cl. .................... 74/421 A; 74/413; 324/207.25
(58) Field of Search .............................. 74/411, 412 R, 74/413, 414, 421 A, 473.12; 324/207.25

(56) References Cited

U.S. PATENT DOCUMENTS 3,038,576 A * 6/1962 Simpson ..................... 192/150
5,284,325 A * 2/1994 Sasaki et al. ................ 254/274
5,819,871 A * 10/1998 Takaoka ..................... 180/444
6,299,545 B1 * 10/2001 Perry et al. ................. 464/182

FOREIGN PATENT DOCUMENTS

JP 11-023207 1/1999
JP 2001-045710 2/2001

* cited by examiner

Primary Examiner—William C. Joyce
Assistant Examiner—Julie K. Smith
(74) Attorney, Agent, or Firm—Pearne & Gordon LLP

(57) ABSTRACT

A geared motor comprising an electric motor, a reduction gear having an input connected to a rotational shaft of the electric motor, an output shaft connected to an output stage gear of the reduction gear, which has a coupling member of resilient material attached thereto and a position sensor for detecting a rotational angle position of the output shaft, which has an input shaft connected to the output stage gear through the coupling member wherein the output stage gear has a protrusion imbedded in the coupling member so as to reinforce the coupling member and prevent it from being twisted whereby there occurs no difference between a rotational angle of the output shaft and that of the input shaft of the position sensor.

30 Claims, 7 Drawing Sheets

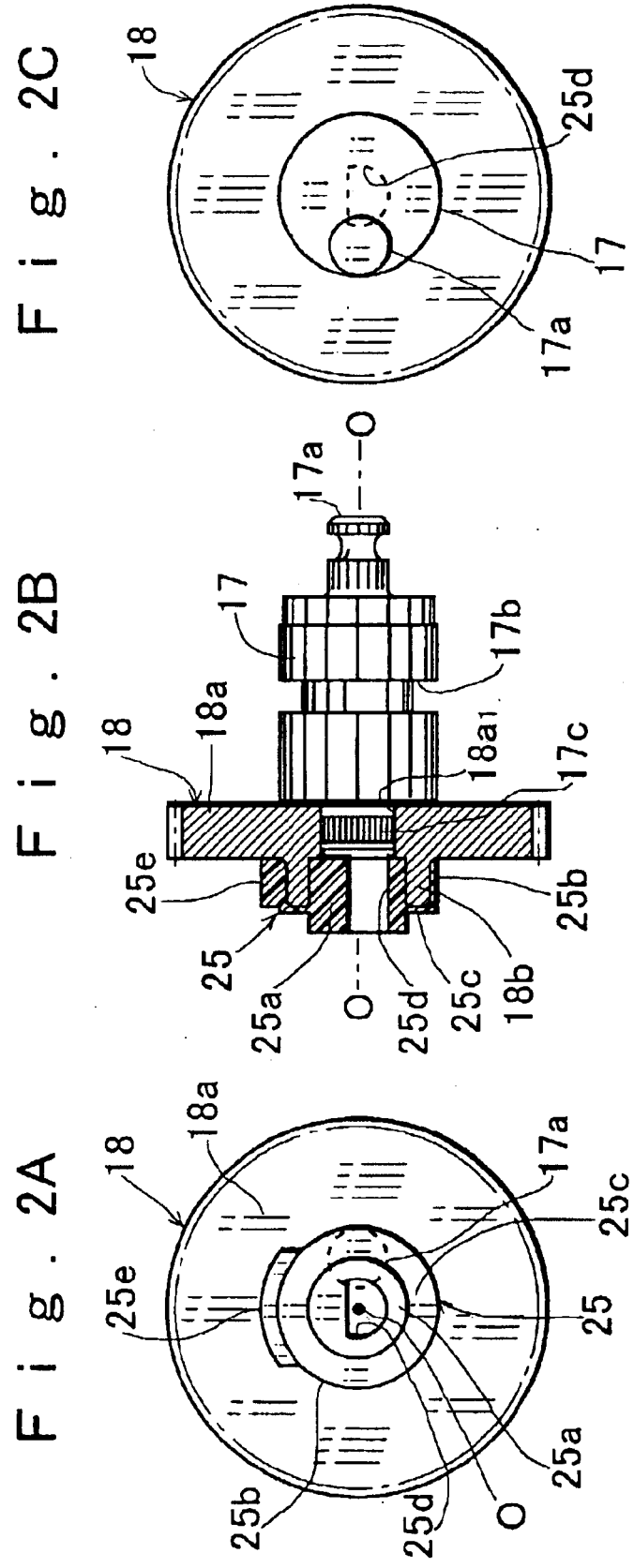

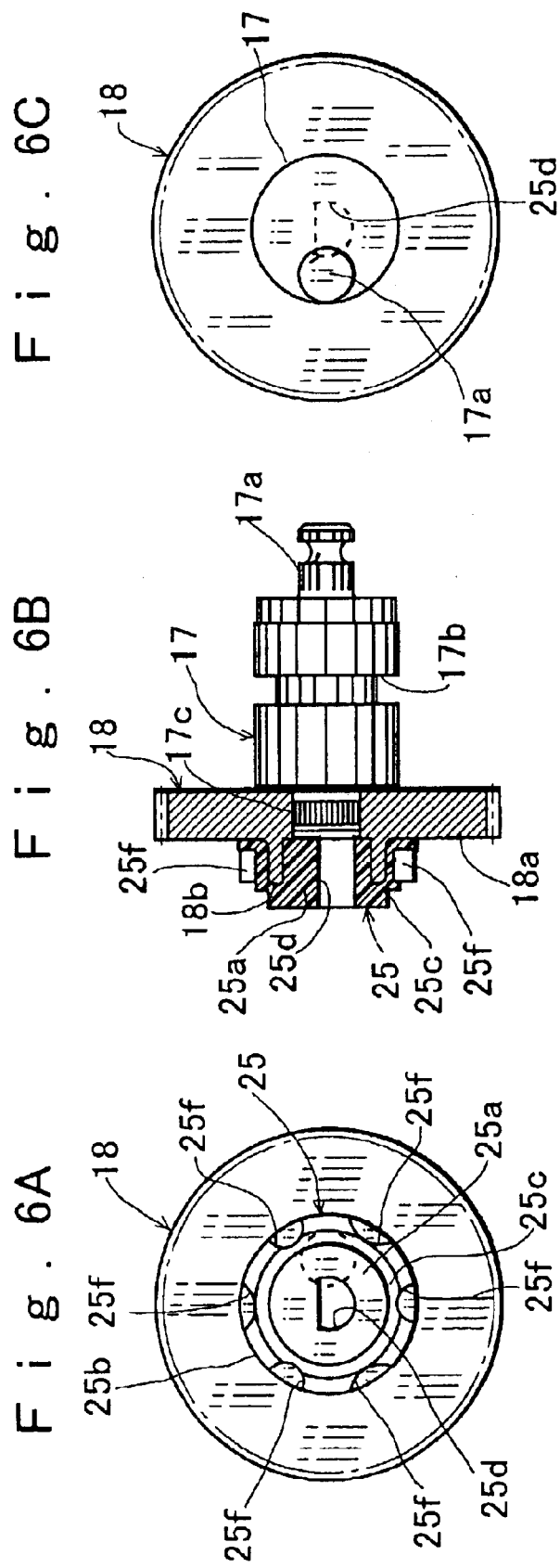

Fig. 9
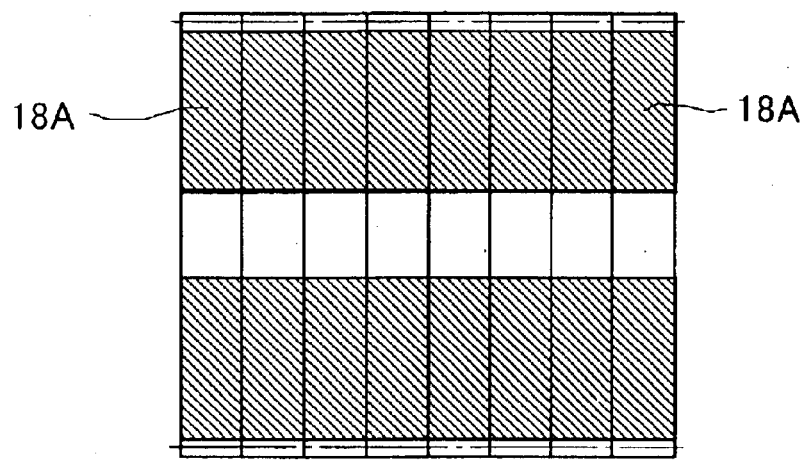
Fig. 10
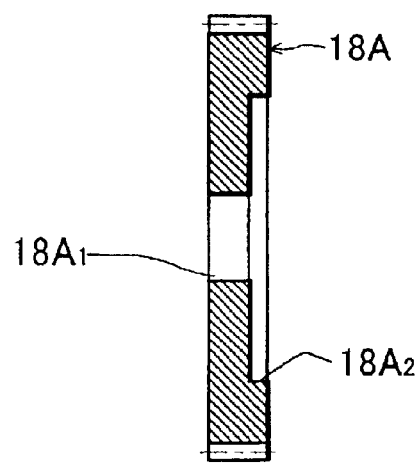
Fig. 11A     Fig. 11B
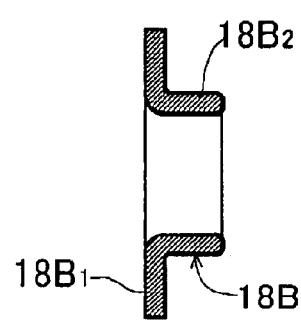 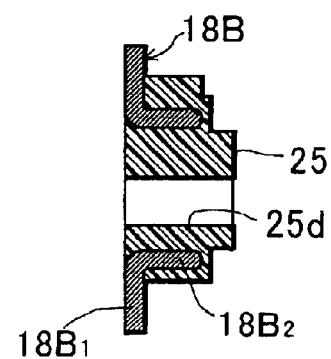

GEARED MOTOR COMPRISING POSITION SENSOR

TECHNICAL FIELD OF THE INVENTION

This invention relates to a geared motor comprising an electric motor and a reduction gear to reduce the rotation of the electric motor to an output shaft thereof.

BACKGROUND OF THE INVENTION

There has been widely used a geared motor as an actuator for operating various control systems. For instance, in a vehicle driven by an internal combustion engine, the geared motor has been used as an actuator to make an operation of changing an automatic transmission between a two wheel drive state and a four wheel drive state, an actuator to operate a clutch of the automatic transmission or an actuator to operate various valves such as an exhaust control valve or a throttle valve.

As shown in JP2001-45710A, the geared motor comprises an electric motor, a reduction gear having an input portion connected to a rotational shaft of the electric motor and an output shaft provided on an output stage gear of the reduction gear to be connected directly or through an appropriate connection member to an operated portion of a load as the control object of the output shaft.

The electric motor also comprises a position sensor to detect information on a rotational angle position of the output shaft and provide the information for a control device because it is used for controlling the position of the load. As shown in JP2001-45710A, the position sensor generally comprises a potentiometer having an input shaft connected directly to the output stage gear of the reduction gear.

In the geared motor having the output stage gear connected directly to the input shaft of the position sensor, when the central axis of the output shaft is slightly inclined relative to that of the input shaft of the position sensor due to a radial load applied from the load to the output shaft, the radial load is applied from the output shaft to the input shaft of the position sensor whereby bearings in which the input shaft of the position sensor is supported are worn out so that the input shaft of the position sensor will get loosely supported or be broken.

Especially, if the connection point of the output shaft and the work load is located at a position shifted relative to the center axis of the output shaft, which will occur when the output shaft is connected through a lever to the work load, for instance, great radial load would be applied to the output shaft whereby the aforementioned problems tend to occur.

In JP11-23207A, it is disclosed a rotational displacement detector for detecting by a potentiometer a rotational displacement of a rotational body as an objective to be detected. It is shown in this document that the rotational body and an input shaft of the potentiometer are connected to each other through a bush of resilient material such as rubber.

In the rotational displacement detector shown in JP11-23207A, the input shaft of the potentiometer has a leading end of D-shaped cross section, the rotational body has the bush of resilient material fitted into a hole in an axis portion of the end thereof, and the input shaft of the potentiometer and the rotational body are connected by press-fitting the D-shaped cut portion of the leading end of the input shaft of the potentiometer into the D-shaped cut hole (hole of D-shaped cross section) in the center of the bush. There is used a member having only a portion engaging the hole in the axis portion of the rotational body for the bush interposed between the input shaft of the potentiometer and the rotational body.

With the construction aforementioned, when the radial load is applied to the output shaft, the radial load applied from the output shaft to the input shaft of the potentiometer can be absorbed by the bush of resilient material so that great radial load is prevented from being applied to the input shaft of the potentiometer whereby the breakage of the potentiometer can be prevented.

It will be considered that the geared motor to which the invention is applied may have such a bush of resilient material fitted into an axial hole of the output stage gear as suggested by the JP11-23207A whereby the input shaft of the position sensor and the output stage gear are coupled through the bush.

However, if the input shaft of the position sensor and the output stage gear are coupled through the bush having only the portion fitted into the axial hole in the output stage gear, it will be hard to increase the mechanical strength of the bush whereby the bush tends to be twisted by an unnegligible degree when the rotational body begins to rotate or stops. Thus, there apparently occurs a problem of reducing the position detection precision of the output shaft.

More particularly, if the bush coupling the rotational body and the input shaft of the position sensor is possibly twisted, there occurs a difference between the rotational angle of the output shaft and that of the input shaft of the position sensor. As a result, there occurs hysteresis in the characteristic of detection of the displacement of the rotational body by the position sensor, which reduces the detection precision of the displacement of the rotational body.

It is required to have a fully high precision of the angular position of the output shaft in order to mount the output shaft on an axis portion of the output stage gear and therefore, if the input shaft of the position sensor is connected to the output sides gear through the bush, it is required to mount the output shaft in a predetermined position relation to the bush coupling the output shaft to the input shaft of the position sensor. If there is used the bush having only the portion fitted into the axial hole in the output stage gear, in a state where the gear is positioned by inserting into a non-circular hole (normally D-shaped) in the center portion of the bush in order to fit the input shaft of the position sensor, it will be considered that the output shaft is press-fitted into the axial hole in the gear.

In this manner, if the gear is positioned by inserting the positioning tool into the central hole in the bush of resilient material, the positioning tool cannot be tightly inserted into the central hole in the bush in order to prevent the deformation of the bush. Thus, there cannot be avoided some clearance between the hole in the bush and the positioning tool. In this manner, if there occurs an error of the angle position due to the clearance between the hole in the bush and the positioning tool, even though the error is slight, there appears the greater error of the angular position of the output shaft in the side of the outer periphery thereof. Therefore, it is hard to obtain the precision of the angle position of the output shaft if the central hole in the bush is used as a positioning reference.

SUMMARY OF THE INVENTION

Accordingly, it is a principal object of the invention to provide a geared motor adapted to prevent the breakage of the position sensor due to excessive force applied to the position sensor by a radial load possibly applied from the output shaft to the input shaft of the position sensor by coupling the input shaft of the position sensor and the output stage gear through a coupling member of resilient material without any reduction of the detection precision of the rotational angle position of the output shaft.

It is an another object of the invention to provide a geared motor adapted to mount the output shaft relative to the position sensor with a fully high angle position detection precision.

This invention is applied to a geared motor comprising an electric motor, a reduction gear having an input portion connected to a rotational shaft of the electric motor, an output shaft coupled to an output stage gear of the reduction gear in a state where the output shaft has an axis common to that of the output stage gear and a position sensor disposed in a state where the position sensor has an axis common to that of the output shaft and having an input shaft coupled to the output stage gear to convert the rotational angle position into an electric signal.

The geared motor of the invention comprises an output stage gear including a gear body having an output shaft mount hole at an axis thereof and a protrusion provided on the gear body so as to protrude from one end face of the gear body in its axial direction around the output shaft mount hole. The output shaft is connected to the gear body by press-fitting it into the output shaft mount hole from the other end face of the gear body in its axial direction. A coupling member formed of resilient material is fixed to the output stage gear with the protrusion embedded in the coupling member. The coupling member has a sensor input shaft insertion hole of non-circular cross section formed therein. The sensor input shaft insertion hole has a rotational central axis corresponding to the central axis of the output shaft. The input shaft of the position sensor has a leading end of cross section corresponding to that of the sensor input shaft insertion hole and is coupled to the output stage gear by press-fitting the leading end into the sensor input shaft insertion hole.

As aforementioned, as the coupling member of resilient material is fixed to the output stage gear of the reduction gear to connect the sensor input shaft to the output stage gear through the coupling member, when the axis of the output shaft is inclined relative to the central axis of the sensor input shaft due to the radial load applied to the output shaft, the radial load applied from the output shaft side to the sensor input shaft can be absorbed by the coupling member. This can prevent the application of the great radial load to the input shaft of the position sensor and the breakage of the position sensor even though the excessive force is applied to the position sensor due to the radial load applied from the work load to the output shaft.

In addition thereto, even though the geared motor is assembled with misalignment arisen between the output shaft and the sensor input shaft, the radial load to the sensor input shaft is reduced so that the breakage of the position sensor can be prevented.

As the coupling member is secured to the output stage gear with the protrusion of the output stage gear imbedded in the coupling member as aforementioned, the coupling member is reinforced by the protrusion so that there can be prevented the twist of the coupling member which tends to occur when the output shaft begins to rotate and stops. Thus, there can be less difference between the rotational angle of the output shaft and that of the input shaft of the position sensor and therefore the detection precision can be enhanced because there can be prevented the hysteresis that occurs in the characteristic of detection of the rotational angle position of the output shaft.

Thus, according to the invention, the breakage of the position sensor can be prevented even though, the radial load is applied from the output shaft side to the sensor input shaft without reducing the detection precision of the rotational angle position of the output shaft.

In a preferred embodiment of the invention, the coupling member may have a positioning protrusion or recess provided on the outer periphery for a position reference of the output shaft when the output shaft is press-fitted into the output stage gear.

With the positioning protrusion or recess provided on the outer periphery of the coupling member to serve as the position reference when the output shaft is press-fitted into the output stage gear, the angle position of the output shaft can be determined on both of the hole in the center portion of the coupling member and the positioning protrusion or recess on the outer periphery of the coupling member, which causes the mount precision of the output shaft to be enhanced.

The coupling member is preferably formed in the state of being integral with the protrusion of the output stage gear. More particularly, the coupling member is preferably formed integrally with the protrusion of the gear by inserting at least the protrusion of the output stage gear into a mould for forming the coupling member and injecting molten resilient resin into the mould.

In the case where the protrusion of the output stage gear is in the cylindrical form, there may be formed a hole or holes or a notch or notches extending through the protrusion in the radial direction of the cylindrical protrusion. When the coupling member is to be formed integrally with the protrusion, the hole or holes or the notch or notches are preferably filled with the resilient material, which the coupling member is formed of.

With such a construction used, the molten resin can preferably enter the mold when the coupling member is molded, which can prevent the formation of the defect portions in the formed coupling member. Thus, it will be noted that the closer adhesion between the coupling member and the protrusion can be improved. Since the coupling strength of the coupling member and the protrusion can be enhanced, the position of the coupling member is never shifted because the coupling member is never removed out of the gear and the reduction of the physical strength of the connection between the inputs shaft of the position sensor and the gear can be prevented.

A plural of protrusions may be provided on the gear in a manner spaced in a peripheral direction of the output shaft mount hole so that the elastic material forming the coupling member is filled in gaps between the adjacent protrusions. This can also achieve the aforementioned effect.

The protrusion or protrusions may be provided integrally with the gear body or separately formed from and secured to the gear body.

In the case where the protrusion or protrusions are formed separately from the gear body, the gear can be more effectively formed because many gear materials are placed in a machine tool while they are superposed one another in an axial direction thereof so that the teeth can be formed on many gear materials simultaneously.

In the case where the protrusion of the output stage gear is formed separately from the gear body as aforementioned, there may be preferably provided a flange member secured to one end of the gear body in its axial direction and the protrusion may be formed integrally with the flange member. Since the flange member can be easily secured to the gear body, such a construction causes the protrusion to be more easily secured to the gear body.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 2A is a left-hand side view of an output stage gear of a reduction gear for the electric motor constructed in accordance with one embodiment;

FIG. 2B is a front view of the output stage gear to which an output shaft is attached with a portion thereof taken in cross section;

FIG. 2C is a right-hand side view of the output stage gear of FIG. 2B;

FIG. 6A is a left-hand side view of the output stage gear of the reduction gear for the electric motor constructed in accordance with another embodiment;

FIG. 6B is a front view of the output stage gear to which the output shaft is attached with a portion thereof taken in cross section;

FIG. 6C is a right-hand side view of the output stage gear of FIG. 6B;

FIG. 9 illustrates a method for manufacturing many gear bodies once by a plural of gear materials arranged in parallel;

FIG. 10 is a cross sectional view of the gear body having the teeth cut by the method shown in FIG. 9;

FIG. 11A is a cross sectional view of a protrusion forming member for forming the output stage gear together with the gear body of FIG. 10;

FIG. 11B is a cross sectional view of the protrusion forming member on which the coupling member is provided;

DETAILED DESCRIPTION OF PREFERRED EMBODIMENTS

Figure 1:
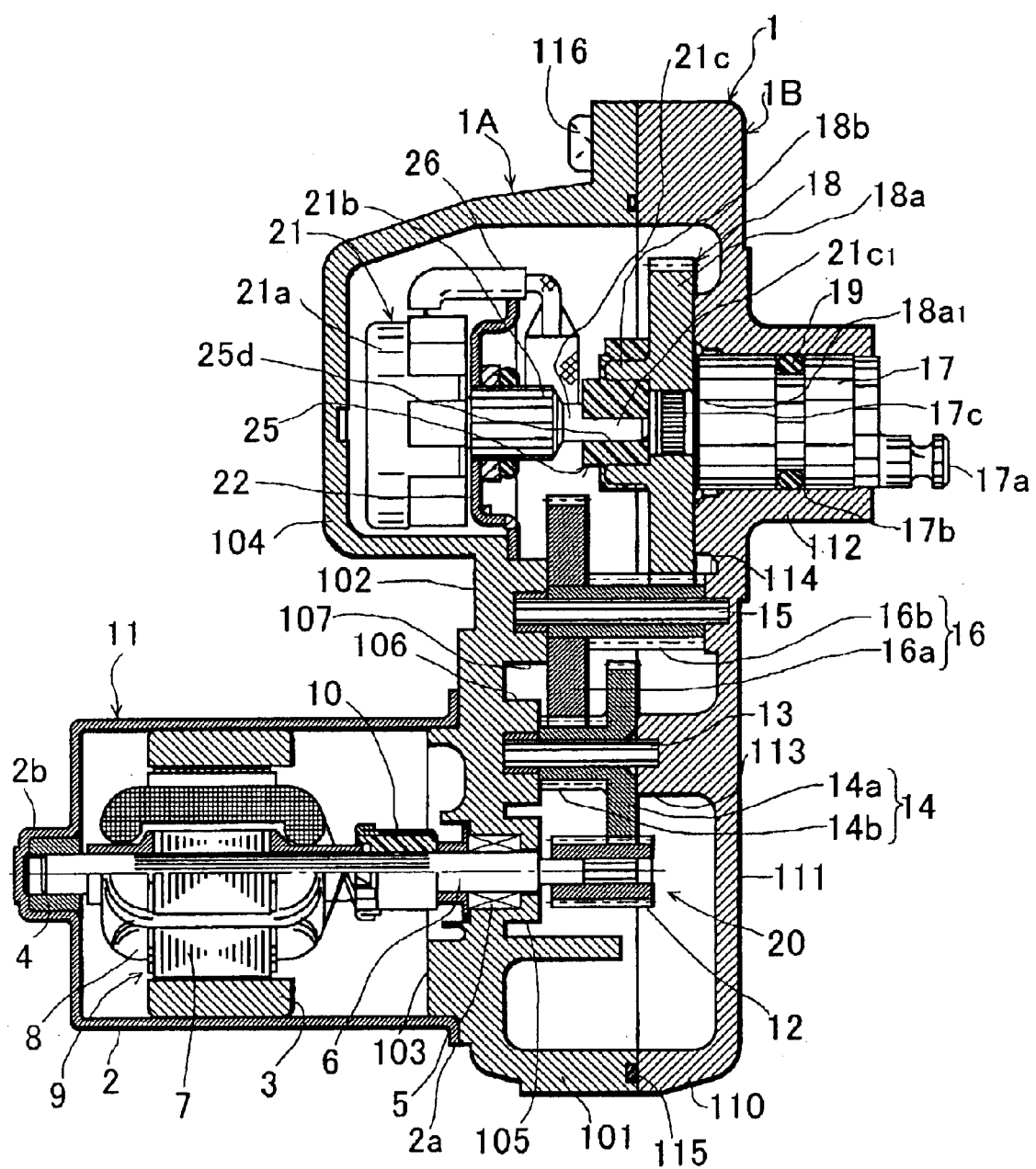
FIG. 1 is a sectional view of a whole geared motor constructed in accordance with one embodiment of the invention.

A geared motor constructed in accordance with one embodiment of the invention is shown in FIG. 1. A case 1 includes a first case half 1A and a second case half 1B by which the case 1 is divided into two. The case 1 may be formed of thermoplastic resin, for instance.

The first case half 1A comprises a peripheral wall portion 101 and a bottom wall portion 102 formed integrally with the peripheral wall portion 101 so as to close one end of the peripheral wall portion 101. A platform portion 103 having a profile of circular cross section is provided on the outer face of the lower portion of the bottom wall portion 102 in a projecting manner. A hollow protrusion 104 is formed on the outer face of the upper portion of the bottom wall portion 102.

A cylindrical bearing holder 105 is formed on the first case half 1A with a portion of the cylindrical bearing holder 105 projecting on the side of the second case half 1B in such a manner as the axis of the bearing holder 105 corresponds to that of the cylindrical outer periphery of the platform portion 103. An annular shaft holder 106 is formed inside of the bottom wall portion 102 of the first case half 1A at a position above the bearing holder 105. Similarly, an annular shaft holder 107 is formed between the shaft holder 106 and the hollow protrusion 104.

The second case half 1B comprises a peripheral wall portion 110 having the same configuration as that of the peripheral wall portion 101 of the first case half 1A and a bottom wall portion 111 formed integrally with the peripheral wall portion 110 so as to close one end of the peripheral wall portion 110. A cylindrical boss 112 is formed on the outer face of the bottom wall portion 111 at its upper portion so that the boss 112 projects on the side opposite to the hollow protrusion 104 of the first case half 104. Shaft holders 113 and 114 are formed inside of the bottom wall portion 111 of the second case half 1B in a manner faced to shaft holders 106 and 107 of the first case half 1A, respectively.

When the case 1 should be assembled, an O-ring 115 is fitted into a groove formed in an end face of the peripheral wall portion 101 of the first case half 1A and then the end face of the peripheral wall portion 101 of the first case half 1A and the end face of the peripheral wall portion 110 of the second case half 1B are butted against each other through the O-ring 115. The peripheral wall portions 101 and 110 are tightened by a plural of bolts 116 (only one bolt is shown in FIG. 1) whereby the case halves 1A and 1B are bonded so as to assemble the case 1.

Onto the outer periphery of the platform portion 103 of the first case half 1A, it is closely fitted an opening end of a peripheral wall portion of a cylindrical motor housing 2. A flange 2a formed around the opening end of the housing 2 is tightened to the bottom wall portion 102 of the first case half 1A by screws not shown. On the inner periphery of the peripheral wall portion of the housing 2, a permanent magnet is mounted to form a field magnet 3 of a stator. A bearing 4 is held in a cylindrical protrusion 2b projecting outward of the center of the bottom wall portion of the housing 2 while a bearing 5 is held in the first bearing holder 105 of the first case half 1A and a rotational shaft of the motor is rotationally supported by the bearings 4 and 5. A rotor 9 of an armature core 7 and an armature coil 8 is mounted on the rotational shaft 6 and a terminal end of the armature coil 8 is connected to a commutator 10 also mounted on the rotational shaft 6. A pair of brushes not shown contact the commutator 10 and a current is supplied from a not shown power supply source through the pair of brushes and the commutator 10 to the armature coil 8. An electric motor 11 is constituted by the housing 2, the stator field magnet 3, the rotational shaft 6, the rotor 9, the commutator 10 and the not shown brushes contacting the commutator 10.

A small gear 12 forming an input stage of the reduction gear is mounted on the rotational shaft 6 in the case 1 and a gear 14 forming a second stage of the reduction gear is rotationally supported on a shaft 13, both ends of which are in turn supported by the opposing shaft holders 106 and 113, respectively. The gear 14 comprises a large gear portion 14a and a small gear portion 14b arranged in an axial direction thereof and mounted on the shaft 13 so that the small gear 14b is positioned within the first case half 1A and the large gear 14a meshes the small gear 12.

A gear 16 forming a third stage of the reduction gear is rotationally supported on a shaft 15, both ends of which are in turn supported by the opposing shaft holders 107 and 114. The gear 16 comprises a large gear portion 16a and a small gear portion 16b arranged in an axial direction thereof and mounted on the shaft 15 so that the large gear 16a is positioned within the first case half 1A and meshes the small gear 14b.

An output shaft 17 is rotationally supported by the boss 112 of the second case half 1B and a gear 18 forming an output stage of the reduction gear is mounted on an end of the output shaft 17 within the case 1. The gear 18 forming the output stage (referred to as output stage gear hereinafter) meshes the small gear 16b forming the third stage of the reduction gear.

In the illustrated embodiment, an O-ring 19 formed of rubber, for instance is fitted into a groove 17b in a middle portion of the output shaft 17, whereby the output shaft is led out in a tightly sealing manner.

In the illustrated embodiment, the reduction gear 20 is formed by the gears 12, 14, 16 and 18 and the rotation of the electric motor 11 is reduced by the reduction gear 20 and transmitted to the output shaft 17.

In the illustrated embodiment, an eccentric shaft 17a is provided at the end face of the output shaft 17 led out outward. The eccentric shaft 17a is provided at a position eccentric relative to the central axis of the output shaft 17 and is connected to an operable input section of the control objective to be operated such as a drive lever for a control valve, a switching lever to switch a two-wheel drive state and a four-wheel drive state of a transmission for a vehicle etc.

The electric motor 11 is driven so as to reciprocally rotate the output shaft 17 within a predetermined angle range and a reciprocal rotation of the eccentric shaft 17a caused by the reciprocal rotation of the output shaft 17 is transmitted to the operable input section for the control objective to be operated.

The geared motor constructed in accordance with the embodiment may be used for a control operation section to control the position of the various control objectives to a target position. When the position of the control objective should be controlled, a position sensor is required for detecting a rotational angle of the output shaft 17 in order to obtain the present position information of the control objective.

In the illustrated embodiment, a potentiometer may be used for the position sensor 21. The potentiometer for the position sensor 21 comprises a sensor body 21a including a base board having a resistance pattern provided thereon and a wiper sliding while it contacts the resistance pattern on the base board, which both are contained in a case and an input shaft 21c rotationally supported in the sensor body 21a through a bearing 21b. The potentiometer is constructed in a conventional manner. The input shaft 21c at its leading end has a D-cut portion 21c1 of a D-shaped cross section formed thereon.

The position sensor 21 is disposed so that the D-cut portion 21c1 at the leading end of the input shaft 21 is directed toward the output stage gear 18 and the central axis of the input shaft 21 corresponds to that of the gear 18 and mounted on a bracket 22 secured to the first case half 1A.

As shown in FIGS. 2A through 2C, the output stage gear 18 comprises a gear body 18a having an output shaft mount hole 18a1 provided at its axis and a cylindrical protrusion 18b secured to the gear body 18a so as to project from the periphery of the output shaft mount hole 18a1 toward one end of the gear body 18a in its axial direction (toward the position sensor).

A coupling member 25 of resilient material such as an industrial rubber material of JIS standards is attached onto the gear 18. The illustrated coupling member 25 comprises a core portion 25a disposed within the protrusion 18b, a peripheral wall portion 25b surrounding the core portion 25a outside of the protrusion 18b and a connection portion 25c connecting the core portion 25a and the peripheral wall portion 25b on the side of the leading end of the protrusion 18b, all of which are integrally formed. The coupling member 25 is secured to the protrusion 18 in a state where the protrusion 18b is imbedded in the coupling member 25 between the core portion 25a and the peripheral wall portion 25b thereof.

A sensor input shaft insertion hole 25d of non-circular cross section having a rotational axis corresponding to the axis of the output shaft 17 is formed in the center portion of the core portion 25a of the coupling member 25. In the illustrated embodiment, the sensor input shaft insertion hole 25d has the form of D-cut hole of D-shaped cross section with an axis O—O passing through the center of circular arc-like portion of cross section of the D-cut hole corresponding to the rotational axis (the axis getting the center of the rotation) of the sensor input shaft insertion hole 25d.

In the illustrated embodiment, a circular arc-like positioning projection 25e directing outward in a radial direction is formed on the outer periphery of the coupling member 25. As described later, the positioning projection 25e together with the sensor input shaft insertion hole 25d is used for a positioning reference when the output shaft 17 should be press-fitted into the gear 18.

Although the coupling member 25 may be secured to the gear 18 by means of adhesion or seizure, it may be preferably formed integrally with gear 18 by inserting at least the protrusion 18b of the gear 18 and the adjacent portion thereof within a coupling member forming mold and injecting a molten elastic resin into the mold, which causes the manufacture cost to be reduced and enables the coupling member 25 to be more rigidly secured to the gear 18.

The output shaft 17 has a knurled smaller radial portion 17c at the end of the output shaft within the case 1. The small radial portion 17c is press-fitted into the output shaft mount hole 18a1 by forcing it from the other end of the gear body 18a in its axial direction and bonded to the gear 18.

The D-cut portion 21c1 of the input shaft 21c of the position sensor 21 having the cross section corresponding to that of the sensor input shaft insertion hole 25d is press-fitted into the sensor input insertion hole 25d to be bonded to the coupling member 25.

As shown in FIG. 1, a lead wire 26 is used for connecting a terminal led out from the position sensor 21 to an exterior control circuit.

With the coupling member 25 of resilient material secured to the output stage gear 18 whereby the sensor input shaft 21c is coupled to the gear 18 through the coupling member 25, when the axis of the output shaft 17 is slightly inclined relative to the axis of the sensor input shaft 21c due to the load applied to the output shaft 17 in the radial direction, the radial load applied from the output shaft 17 to the sensor input shaft 21c can be absorbed by the coupling member 25 and therefore the great radial load can be prevented from being applied to the input shaft 21c of the position sensor 21. Thus, when the radial load is applied from the work load to the output shaft 17, the breakage of the position sensor can be prevented, which occurs due to the excessive force applied to the position sensor 21.

Figure 13A:
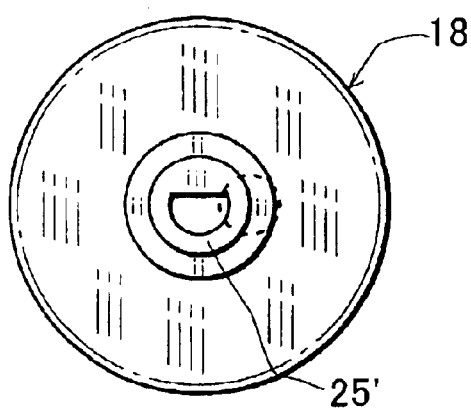
FIG. 13A is a left-hand side view of a bush attached to the output stage gear used for the geared motor, which is the objective of the invention, in accordance with the suggestion of the prior art.
Figure 13B:
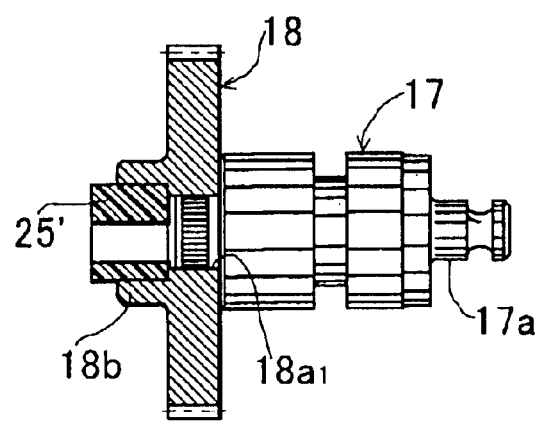
FIG. 13B is a front view of the bush and the output stage gear to which the bush is attached as shown in FIG. 13A, with the gear taken in cross section.

As shown in FIGS. 13A and 13B, it will be considered by the suggestion of JP11-23207A that the input shaft of the position sensor and the output stage gear 18 in the geared motor are coupled to each other by using a bush 25' having only a portion engaging an inside hole of the protrusion 18b of the output stage gear 18. However, since in such a construction, it is hard to enhance the mechanical strength of the bush 25', there occurs inevitably an unnegligible twist of the bush 25' when the output stage gear 18 rotates. As the unnegligible twist of the bush 25 occurs, there arises a difference between the rotational angle of the output shaft 17 and that of the input shaft 21c of the position sensor 21, which causes the reduction of the detection precision of the rotational angle position of the output shaft.

On the other hand, with the coupling member 25 of resilient material secured to the output stage gear 18 in the state where the protrusion 18b of the output stage gear 18 is imbedded in the coupling member 25, the coupling member 25 can be reinforced by the protrusion 18b and therefore, the twist of the coupling member 25, which arises when the output shaft 17 begins to rotate and stops, can be prevented. Thus, there can be less difference between the rotational angle of the output shaft 17 and that of the position sensor 21 and as a result, the hysteresis in the detection characteristic of the rotational angle position of the output shaft 17 can be controlled so that the detection precision can be improved.

With the positioning projection 25e formed on the outer face of the coupling member 25 as the positioning reference of the output shaft 17 when the output shaft 17 should be press-fitted into the gear 18 as in the aforementioned embodiment, the angular position of the output shaft 17 can be positioned using both of the central hole 25d and the positioning projection 25e of the coupling member 25 whereby the mount precision of the output shaft 17 can be enhanced.

Figure 3A:
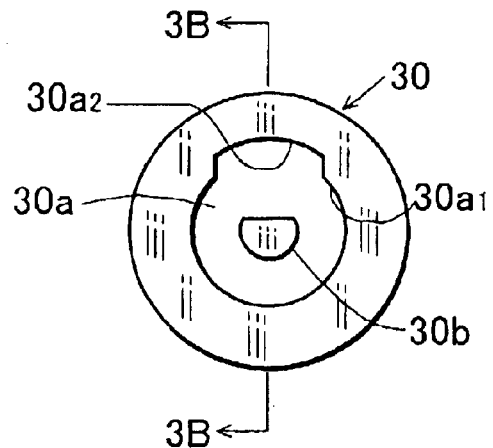
FIG. 3A is an upper face view of an output stage gear side tool used for attaching the output shaft to the gear in the geared motor shown in FIG. 1.
Figure 3B:
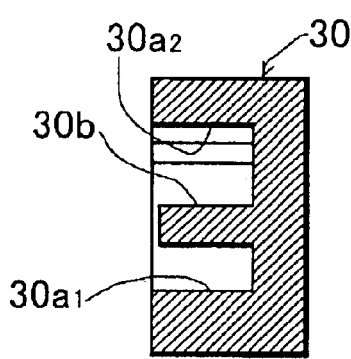
FIG. 3B is a cross sectional view of the tool taken along a line 3B—3B of FIG. 3A.
Figure 4A:
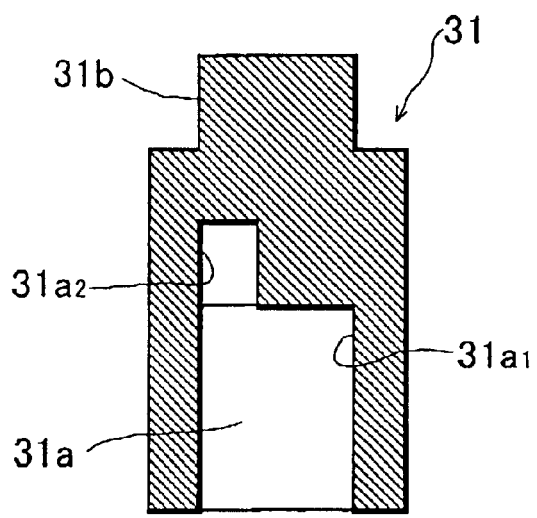
FIG. 4A is a vertically sectional view of an output shaft side tool used for attaching the output shaft to the gear in the geared motor shown in FIG. 1.
Figure 4B:
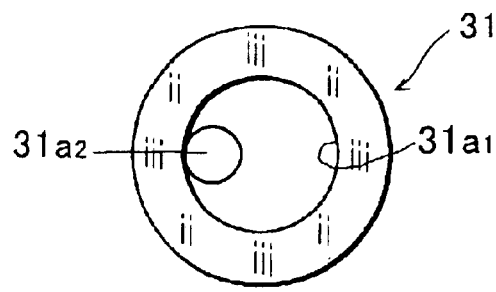
FIG. 4B is a lower face view of the tool of FIG. 4A.

An example of a tool used for mounting the output shaft 17 on the gear 18 is shown in FIGS. 3 and 4. FIG. 3A is an upper face view of a gear side tool 30 for the output stage gear 18, FIG. 3B is a cross sectional view of the tool 30 taken along a line 3B—3B of FIG. 3A, FIG. 4A is a vertically sectional view of an output shaft side tool 31 for the output shaft 17 sectioned vertically as viewed from the front face thereof and FIG. 4B is a lower face view of the tool 31 of FIG. 4A;

The gear side tool 30 shown in FIG. 3 comprises a cylindrical body having a recess 30a including an inner peripheral face 30a1 into which the outer cylindrical face of the coupling member 25 is closely engaged and a positioning projection engagement portion 30a2 into which the projection 25e formed on the outer face of the coupling member 25 is closely engaged and a shaft portion 30b raised from the bottom of the recess 30a to be inserted into the sensor input shaft insertion hole 25d of the coupling member 25.

The output shaft side tool 31 shown in FIG. 4 comprises a cylindrical body having an output shaft engagement recess 31a formed to engage the output shaft 17 thereinto. In the illustrated embodiment, since the output shaft 17 has the eccentric shaft portion 17a, the output shaft engagement recess 31a comprises a first recess portion 31a1 of circular cross section into which the shaft body of the output shaft 17 is engaged and a second recess portion 31a2 into which the eccentric shaft portion 17a is engaged. A small radial mount portion 31b is formed on the end of the tool 31 opposite to the opening end of the recess 31a. This mount portion 31b is used when the tool 31 is attached to a movable rod of a press-fitting machine.

Figure 5:
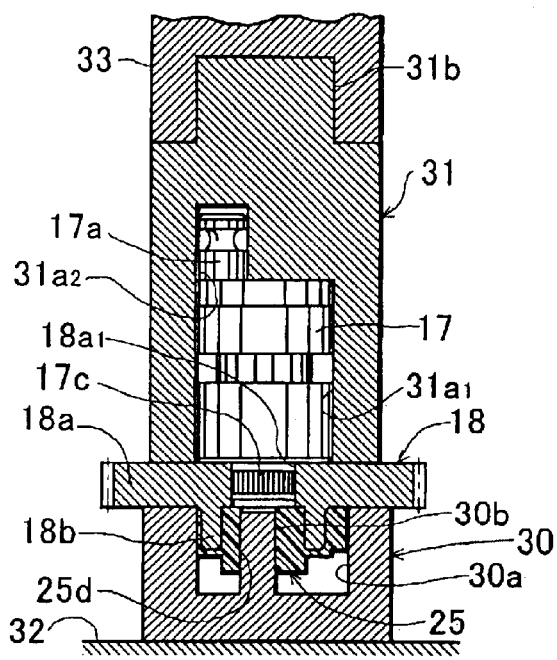
FIG. 5 illustrates in cross section how to attach the output shaft to the output stage gear using the tools of FIGS. 3 and 4.

When the output shaft 17 should be mounted on the gear 18 using the tools 30 and 31, as shown in FIG. 5, the gear side tool 30 is secured onto a stationary table 32 of the press-fitting machine and the output shaft side tool 31 is attached to a lower end of the movable rod 33 of the press-fitting machine which is driven upwardly and downwardly. The coupling member 25 attached to the gear 18 is engaged into the recess 30a of the gear side tool 30, the shaft portion 30b is inserted into the sensor input shaft insertion hole 25d in the coupling member 25 and the gear 18 is mounted on the upper end face of the tool 30.

The output shaft 17 is engaged into the recess 31a in the output shaft side tool 31. The engagement of the output shaft 17 into the recess 31a should be made in a slightly tight manner so that the output shaft 17 can be removed out of the recess 31a with little difficulty after the output shaft 17 is press-fitted into the gear 18, but so that the output shaft 17 is prevented from dropping due to its gravity.

In this manner, after the gear 18 and the output shaft 17 are set in the tools 30 and 31, respectively, the movable rod 33 of the fitting machine is lowered whereby the small radial portion 17c of the output shaft 17 projecting from the lower end of the tool 31 is fitted into the hole 18a1 at the axis of the gear 18.

The coupling member 25 can be positioned at a predetermined angular position by the tool 30 and the output shaft 17 is positioned at a predetermined angular position by the tool 31. Thus, the output shaft 17 can be mounted on the gear 18 in the state where it always has a predetermined angular position relative to the coupling member 25.

With the positioning projection 25e provided on the outer periphery of the coupling member 25 as the positioning reference for the output shaft 17 when it should be fitted into the gear 18, the angular position of the output shaft 17 can be positioned by both of the central hole 25d of the coupling member 25 and the outer peripheral projection 25e and therefore, the position precision of the output shaft 17 relative to the angular position of the input shaft of the position sensor can be improved.

Although, in the illustrated embodiment, the positioning projection 25e is formed on the outer periphery of the coupling member 25 for making a positioning reference of the output shaft 17, as shown in FIGS. 6A through 6C, positioning recesses 25f may be formed in the outer periphery of the coupling member 25 as a positioning reference of the output shaft 17. At least one positioning recess 25f may be formed as the reference of the output shaft, but in the illustrated embodiment of FIG. 6, six positioning recesses 25f may be formed in an equally spaced around the outer periphery of the coupling member 25.

Figure 7:
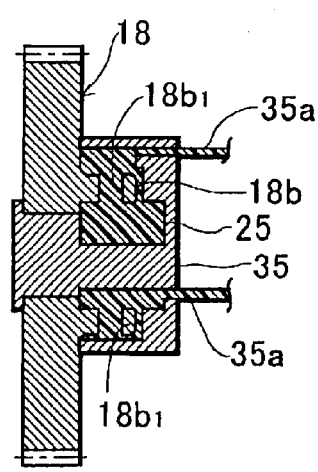
FIG. 7 briefly illustrates a state where the coupling member is integrally formed with the output state gear with the whole taken in cross section.

As shown in FIG. 7, the aforementioned coupling member may be preferably formed integrally with the protrusion 18b of the gear 18 by inserting at least the protrusion 18b of the output stage gear 18 within a mold 35 for forming the coupling member 25 and then pouring a molten elastic resin into the mold 35. In this case, as shown in FIG. 7, there may be preferably provided a hole 18b1 extending through the protrusion 18b of the gear 18 in its radial direction so that the hole 18b1 is filled with the elastic material.

In FIG. 7, a reference numeral 35a designates a gate through which the molten resin is poured into the mold 35. Practically, the mold 35 may be so constructed to be able to be divided, but the divisional face of the mold is not shown in FIG. 7.

With the hole 18b1 formed in the protrusion 18b of the gear 18 as aforementioned, the molten resin can preferably enter the whole mold 35 in a better state, which can prevent the formation of the defects in the formed coupling member 25. Furthermore, since the hole 18b1 is filled with a portion of the resin forming the coupling member 25, the mount strength of the coupling member 25 can be further enhanced.

Although, in the embodiment illustrated in FIG. 7, the hole 18b1 is formed in the protrusion 18b of the gear 18, a notch in place of the hole 18b1 may be formed in the protrusion 18b. Also, there may be provided a plural of protrusions of circular arc-like cross section spaced in the radial direction in place of the cylindrical protrusion 18b so that the resin forming the coupling member 25 may be filled between each other of these protrusions.

In the illustrated embodiment, the protrusion 18b of the output stage gear 18 is provided integrally with the gear body. In the case where the gear is formed of metal, there is required a cutting operation for forming the protrusion 18b, which will cause the manufacture of the gear to be inevitably expensive.

Figure 8:
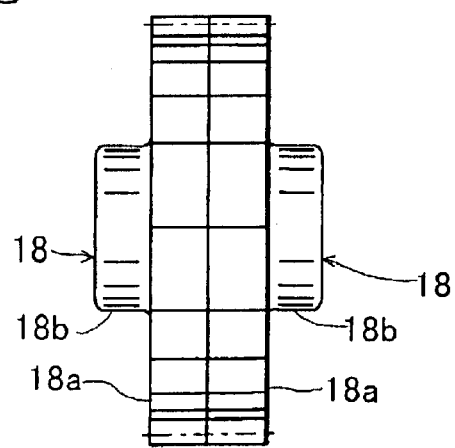
FIG. 8 illustrates in a front view a state where the teeth are cut in the output stage gear shown in FIG. 2.

Although the gears are preferably manufactured by setting a plural of gear materials in a working machine while they are arranged in the axial direction and forming the gears simultaneously from the gear materials, if the gear 18 has the protrusion 18b previously formed in one end thereof in the axial direction, only two gear materials can be arranged as shown in FIG. 8 and therefore the manufacture efficiency of the gear cannot be improved.

In order to enhance the manufacture efficiency of the gear, many gear bodies 18A may be simultaneously manufactured by placing many gear materials in a machine tool such as a hobbing machine while they are arranged as shown in FIG. 9 and forming the teeth on the gear materials by simultaneous cutting operation.

In order to simultaneously manufacture many gear bodies 18A as shown in FIG. 9, the protrusion may be formed separately from the gear bodies 18A, then the protrusion may be fitted to each gear body after the gear bodies are manufactured Accordingly, in a preferred embodiment of the invention, as shown in FIG. 10, the gear 18 preferably comprises the gear body 18A including a hole 18A1 formed at its axis and a circular recess 18A2 formed in one end face thereof so as to have an axis common to that of the hole 18A1 and a protrusion forming member 18B including a circular flange 18B1 having a size enough to be engaged in the circular recess 18A2 of the gear body 18A and a protrusion 18B2 projecting from the inner periphery of the circular flange 18B1 in one of the sides in the axial direction thereof.

The protrusion forming member 18B may be formed of either material identical to that of the gear body 18A or material having the strength equal to that of the gear body 18A or more or less. If the gear body is formed of metal, the protrusion forming member 18B may be preferably formed of metal.

In the protrusion forming member 18B shown in FIG. 11, the protrusion 18B2 is shown to be cylindrically formed. The protrusion forming member 18B having such a protrusion can be more easily manufactured by press working a metal plate.

Figure 12:
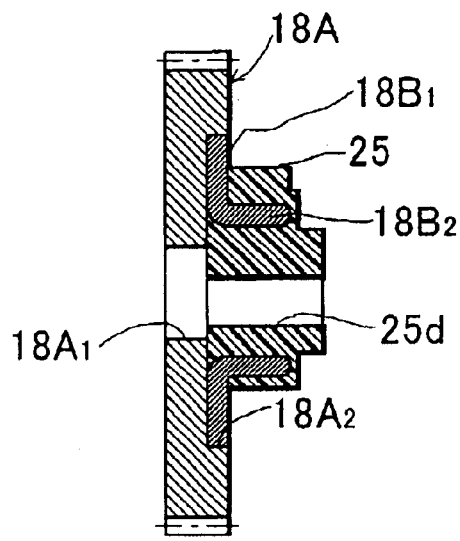
FIG. 12 is a cross sectional view of the output state gear constructed by using the gear body of FIG. 10 and the protrusion forming member of FIG. 11B.

The protrusion forming member 18B shown in FIG. 11A is inserted within the coupling member forming mold and the coupling member 25 of elastic material is formed integrally with the protrusion forming member 18B as shown in FIG. 11B. Thereafter, as shown in FIG. 12, the flange 18B1 of the protrusion forming member 18B is closely placed in the recess 18A2 of the gear body 18A and the flange 18B1 is secured to the gear body 18A whereby the protrusion forming member 18B is attached to the gear body 18A. The attachment of the flange 18B1 to the gear body 18A may be accomplished by either spot-welding the flange 18B1 to the gear body 18A or calking the peripheral edge of the recess 18A2 to the flange 18B1.

Alternatively, the attachment of the flange 18B1 to the gear body 18A may be accomplished by engaging the flange 18B1 into the recess 18A2 of the gear body 18A and then calking the peripheral portion of the flange 18B1 so as to squeeze it and enlarge the outer diameter of the flange 18B1.

As the protrusion is formed separately from the gear body as aforementioned, the gear body can be more effectively manufactured because many gear materials are placed in the machine tool while they are superposed one another in their axial direction and the teeth on the gear materials are cut simultaneously so that all the gear bodies 18A can be simultaneously manufactured as shown in FIG. 9.

In the illustrated embodiments, the gears forming the reduction gear may be formed of metal or alternatively of synthetic resin having a fully mechanical strength.

Although, in the illustrated embodiments, the output shaft 17 at its end has the eccentric shaft portion 17a, which is connected to the work load, it may be connected through a connection member such as a lever to the work load or directly connected to the rotational shaft of the work load without any eccentric shaft portion. The present invention may be applied to the geared motor of such a connection type.

Although, in the illustrated embodiments, the sensor input shaft insertion hole at the center of the coupling member may have the D-shaped cross section, it may have other non-circular cross sections so long as the relative rotation between the input shaft of the position sensor and the coupling member can be prevented. The cross section of the input shaft of the position sensor at its leading end should have the shape corresponding to that of the sensor input shaft insertion hole of the coupling member.

Although, in the illustrated embodiments, the coupling member is formed integrally with the gear, it may be separately formed and be bonded to the protrusion of the gear by fitting it onto the protrusion. In this case, as the cross section of the protrusion of the gear is rectangular, the bonding strength of the coupling member and the gear can be enhanced.

As aforementioned, according to the invention, since the coupling member of resilient material is secured to the output stage gear of the reduction gear and the input shaft of the sensor is coupled to the gear through the coupling member, when the radial load is applied to the output shaft so that the axis of the output shaft is slightly inclined relative to the axis of the input shaft of the sensor, the radial load from the output shaft to the input shaft of the sensor can be absorbed by the coupling member. Thus, according to the invention, the great radial load can be prevented from being applied to the input shaft of the position sensor and therefore there can be prevented the breakage of the position sensor due to excessive force applied to the position sensor when the radial load is applied from the work load to the output shaft.

In addition thereto, since the coupling member is secured to the output stage gear in the state where the protrusion of the output stage gear is imbedded in the coupling member, the coupling member can be reinforced by the protrusion and therefore, the twist of the coupling member, which occurs when the output shaft begins to rotate and stops, can be prevented. Thus, there can be less difference between the rotational angle of the output shaft and that of the input shaft of the position sensor and as a result, the hysteresis in the detection characteristic of the rotational angle position of the output shaft can be controlled so that the detection precision can be improved.

In this manner, according to the invention, there can be prevented the breakage of the position sensor, which occurs due to the radial load acting from the output shaft to the input shaft of the sensor, without any reduction of the detection precision of the rotational angle position of the output shaft.

In the invention, in the case where the positioning projection or recess serving as the positioning reference when the output shaft is press-fitted into the output stage gear is formed on or in the outer periphery of the coupling member, since the angular position of the output shaft can be determined by both of the hole at the center of the coupling member and the positioning projection or recess around the outer periphery of the coupling member, the mount precision of the output shaft can be improved.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A geared motor comprising an electric motor; a reduction gear having an input portion connected to a rotational shaft of said electric motor; an output shaft coupled to an output stage gear of said reduction gear in a state where said output shaft has an axis common to the axis of said output stage gear and a position sensor disposed in a state where said position sensor has an axis common to that of said output shaft and having an input shaft coupled to said output stage gear to convert a rotational angle position into an electric signal; said output stage gear including a gear body having an output shaft mount hole at an axis thereof and a protrusion provided on the gear body so as to protrude from one end face of said gear body in an axial direction around said output shaft mount hole; said output shaft being coupled to said gear body by fitting said output shaft into said output shaft mount hole from the other end face of said gear body in the axial direction thereof; a coupling member formed of resilient material being secured to said output stage gear with said protrusion embedded in said coupling member; said coupling member having a sensor input shaft insertion hole of non-circular cross section formed therein with a rotational central axis corresponding to a central axis of said output shaft; and said input shaft of said position sensor having a leading end of cross section corresponding to that of said sensor input shaft insertion hole and being coupled to said output stage gear by fitting said leading end into said sensor input shaft insertion hole.

2. A geared motor as set forth in claim 1, wherein said coupling member has a positioning projection or recess provided on an outer periphery thereof serving as a positioning reference when said output shaft is fitted into said output stage gear.

3. A geared motor as set forth in claim 1, wherein said coupling member is formed integrally with said protrusion of said output stage gear.

4. A geared motor as set forth in claim 2, wherein said coupling member is formed integrally with said protrusion of said output stage gear.

5. A geared motor as set forth in claim 3, wherein said protrusion is formed in the cylindrical form and has a hole extending through said protrusion in a radial direction thereof and an elastic material forming said coupling member is filled in said hole extending through said protrusion.

6. A geared motor as set forth in claim 4, wherein said protrusion is formed in the cylindrical form and has a hole extending through said protrusion in a radial direction thereof and an elastic material forming said coupling member is filled in said hole extending through said protrusion.

7. A geared motor as set forth in claim 3, wherein said protrusion is formed in the cylindrical form and has at least one notch extending through said protrusion in a radial direction thereof and an elastic material forming said coupling member is filled in said notch.

8. A geared motor as set forth in claim 4, wherein said protrusion is formed in the cylindrical form and has at least one notch extending through said protrusion in a radial direction thereof and an elastic material forming said coupling member is filled in said notch.

9. A geared motor as set forth in claim 3, wherein a plural of protrusions are provided in a manner spaced along a peripheral direction of said output shaft mount hole and an elastic material forming said coupling member is filled in a gap between each other of said protrusions.

10. A geared motor as set forth in claim 4, wherein a plural of protrusions are provided in a manner spaced along a peripheral direction of said output shaft mount hole and an elastic material forming said coupling member is filled in a gap between each other of said protrusions.

11. A geared motor as set forth in claim 1, wherein said protrusion of said output stage gear is formed separately from and secured to said gear body.

12. A geared motor as set forth in claim 2, wherein said protrusion of said output stage gear is formed separately from and secured to said gear body.

13. A geared motor as set forth in claim 3, wherein said protrusion of said output stage gear is formed separately from and secured to said gear body.

14. A geared motor as set forth in claim 4, wherein said protrusion of said output stage gear is formed separately from and secured to said gear body.

15. A geared motor as set forth in claim 5, wherein said protrusion of said output stage gear is formed separately from and secured to said gear body.

16. A geared motor as set forth in claim 6, wherein said protrusion of said output stage gear is formed separately from and secured to said gear body.

17. A geared motor as set forth in claim 7, wherein said protrusion of said output stage gear is formed separately from and secured to said gear body.

18. A geared motor as set forth in claim 8, wherein said protrusion of said output stage gear is formed separately from and secured to said gear body.

19. A geared motor as set forth in claim 9, wherein said protrusion of said output stage gear is formed separately from and secured to said gear body.

20. A geared motor as set forth in claim 10, wherein said protrusion of said output stage gear is formed separately from and secured to said gear body.

21. A geared motor as set forth in claim 1, wherein said protrusion of said output stage gear is formed separately from said gear body and formed integrally with a flange member secured to one end of said gear body in its axial direction.

22. A geared motor as set forth in claim 2, wherein said protrusion of said output stage gear is formed separately from said gear body and formed integrally with a flange member secured to one end of said gear body in its axial direction.

23. A geared motor as set forth in claim 3, wherein said protrusion of said output stage gear is formed separately from said gear body and formed integrally with a flange member secured to one end of said gear body in its axial direction.

24. A geared motor as set forth in claim 4, wherein said protrusion of said output stage gear is formed separately from said gear body and formed integrally with a flange member secured to one end of said gear body in its axial direction.

25. A geared motor as set forth in claim 5, wherein said protrusion of said output stage gear is formed separately from said gear body and formed integrally with a flange member secured to one end of said gear body in its axial direction.

26. A geared motor as set forth in claim 6, wherein said protrusion of said output stage gear is formed separately from said gear body and formed integrally with a flange member secured to one end of said gear body in its axial direction.

27. A geared motor as set forth in claim 7, wherein said protrusion of said output stage gear is formed separately from said gear body and formed integrally with a flange member secured to one end of said gear body in its axial direction.

28. A geared motor as set forth in claim 8, wherein said protrusion of said output stage gear is formed separately from said gear body and formed integrally with a flange member secured to one end of said gear body in its axial direction.

29. A geared motor as set forth in claim 9, wherein said protrusion of said output stage gear is formed separately from said gear body and formed integrally with a flange member secured to one end of said gear body in its axial direction.

30. A geared motor as set forth in claim 10, wherein said protrusion of said output stage gear is formed separately from said gear body and formed integrally with a flange member secured to one end of said gear body in its axial direction.

* * * * *